(12) United States Patent
Li et al.

(10) Patent No.: US 9,803,532 B2
(45) Date of Patent: Oct. 31, 2017

(54) PREDICTIVE CONTROL OF AMMONIA STORAGE IN A SELECTIVE CATALYTIC REDUCTION DEVICE USING CONNECTIVITY INFORMATION

(71) Applicant: GM GLOBAL TECHNOLOGY OPERATIONS LLC, Detroit, MI (US)

(72) Inventors: Shifang Li, Shelby Township, MI (US); Min Sun, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/810,771

(22) Filed: Jul. 28, 2015

(65) Prior Publication Data

US 2017/0030243 A1 Feb. 2, 2017

(51) Int. Cl.
*F01N 3/20* (2006.01)
*F01N 9/00* (2006.01)
*F01N 3/08* (2006.01)

(52) U.S. Cl.
CPC .......... *F01N 9/005* (2013.01); *F01N 3/0842* (2013.01); *F01N 3/208* (2013.01); *F01N 3/2066* (2013.01); *F01N 9/007* (2013.01); *Y02T 10/24* (2013.01)

(58) Field of Classification Search
CPC .......... F01N 2900/1622; F01N 3/0842; F01N 3/2066; F01N 2610/02; F01N 9/005; F01N 3/208; F01N 9/007; F02D 2200/701; Y02T 10/24
See application file for complete search history.

(56) References Cited

U.S. PATENT DOCUMENTS

| 7,426,825 | B2 | 9/2008 | Viola et al. |
| 7,469,531 | B2 | 12/2008 | Viola |
| 7,736,595 | B2 | 6/2010 | Gady et al. |
| 8,096,110 | B2 | 1/2012 | Solbrig |
| 8,333,062 | B2 | 12/2012 | Sun |
| 8,392,091 | B2 | 3/2013 | Hebbale et al. |
| 8,855,894 | B2 | 10/2014 | Hamama et al. |
| 2010/0030437 | A1 | 2/2010 | Kim et al. |
| 2010/0030447 | A1 | 2/2010 | Smyth et al. |
| 2010/0043404 | A1* | 2/2010 | Hebbale .................... F01N 9/00 60/286 |

(Continued)

FOREIGN PATENT DOCUMENTS

NL EP 0516895 A1 * 12/1992 ............ C12M 41/48

*Primary Examiner* — Brandon Lee

(57) ABSTRACT

A method for controlling a selective catalytic reduction device in an exhaust aftertreatment system of a vehicle includes monitoring vehicle connectivity information, and controlling ammonia storage in the selective catalytic reduction device based on the monitored vehicle connectivity information. Vehicle connectivity information is used to predict vehicle operating conditions along an estimated path of vehicle travel. The predicted vehicle operating conditions are used to predict profiles for vehicle exhaust gas parameters. Predicted profiles for exhaust gas parameters are used in determining ammonia storage setpoints for the selective catalytic reduction device. The ammonia storage setpoints are use in regulating an amount of ammonia producing dosing agent injected into the exhaust aftertreatment system, thereby controlling ammonia storage in the selective catalytic reduction device.

11 Claims, 3 Drawing Sheets

(56) References Cited

U.S. PATENT DOCUMENTS

2011/0005209 A1 1/2011 Gady et al.
2011/0202253 A1* 8/2011 Perry .................. F01N 13/009
　　　　　　　　　　　　　　　　　　　　701/102

* cited by examiner

PREDICTIVE CONTROL OF AMMONIA STORAGE IN A SELECTIVE CATALYTIC REDUCTION DEVICE USING CONNECTIVITY INFORMATION

TECHNICAL FIELD

This disclosure pertains generally to exhaust aftertreatment for internal combustion engines, and more particularly to the control of ammonia storage in selective catalytic reduction devices.

BACKGROUND

The statements in this section merely provide background information related to the present disclosure. Accordingly, such statements are not intended to constitute an admission of prior art.

Manufacturers of internal combustion engines are continuously developing new engine control strategies to satisfy customer demands and meet various regulations. One such engine control strategy comprises operating an engine at an air/fuel ratio that is lean of stoichiometry to improve fuel economy and reduce greenhouse gas emissions. Such engines include both compression ignition (diesel) and lean-burn spark-ignition engines. When an engine operates in a region lean of air/fuel stoichiometry, this typically results in increased combustion temperatures, which leads to increased oxides of nitrogen (NOx) emissions.

One proposed type of exhaust aftertreatment system and control strategy for managing and reducing NOx emissions involves the injection of a dosing agent such as diesel exhaust fluid (DEF) into an exhaust gas feedstream entering a selective catalytic reduction (SCR) device. DEF comprises a solution of urea and deionized water, which decomposes into ammonia ($NH_3$) when heated in the exhaust gas feedstream. A typical SCR device has a capacity to store the ammonia resulting from the decomposed urea on its catalyst surface. The NOx in the exhaust gas passing through the SCR is reduced by the stored ammonia on the catalyst surface into nitrogen gas ($N_2$), water ($H_2O$), and small amounts of carbon dioxide ($CO_2$), which are passed out of the SCR device.

The SCR device is able to continue NOx reduction using the stored ammonia when the dosing injection system is not supplying urea. The maximum ammonia storage capacity of the SCR device is inversely related to its operating temperature, which can be determined empirically.

This SCR process works reasonably well, provided the SCR catalyst is maintained at the right temperature (approximately 570° to 750° F.), and the correct amount of urea is injected and stored as ammonia in the SCR device for reducing NOx in the exhaust feedstream. If too little ammonia is stored in the SCR device as compared to the amount of $NO_x$ in the exhaust feedstream, conversion efficiency will drop, and undesirable NOx emissions exiting the exhaust aftertreatment system will increase. Conversely, if the maximum ammonia storage capacity of the SCR device is exceeded, an undesirable phenomenon known as ammonia slip will occur, where unprocessed $NH_3$ exits the SCR device.

Additionally, if the operating temperature of the SCR device increases rapidly at a time when ammonia storage is near its maximum, ammonia slip can also occur due to the inverse relationship between the temperature of the SCR device and its maximum ammonia storage capacity. This can occur, for example, when exhaust gas temperature increases rapidly due to heavy accelerator pedal tip-in by the vehicle operator.

Conventional methods for controlling ammonia storage in SCR devices rely on various sensors, which attempt to measure real-time values of various engine operating parameters and exhaust gas parameters. Such conventional control systems are reactionary as they have to react to changes in operating parameters after the fact, which results in less than optimal control.

Accordingly, there exists a need in the art for more effective control of ammonia storage in SCR devices for improving NOx emission conversion and reducing ammonia slip.

SUMMARY

A method for controlling a selective catalytic reduction device in an exhaust aftertreatment system of a vehicle includes monitoring vehicle connectivity information, and controlling ammonia storage in the selective catalytic reduction device based on the monitored vehicle connectivity information. Vehicle connectivity information is used to predict vehicle operating conditions along an estimated path of vehicle travel. The predicted vehicle operating conditions are used to predict profiles for vehicle exhaust gas parameters. The predicted profiles for exhaust gas parameters are used in determining ammonia storage setpoints for the selective catalytic reduction device. Ammonia storage setpoints are use in regulating an amount of ammonia producing dosing agent injected into the exhaust aftertreatment system, thereby controlling ammonia storage in the selective catalytic reduction device.

BRIEF DESCRIPTION OF THE DRAWINGS

One or more embodiments will now be described, by way of example, with reference to the accompanying drawings, in which.

DETAILED DESCRIPTION

Figure 1:
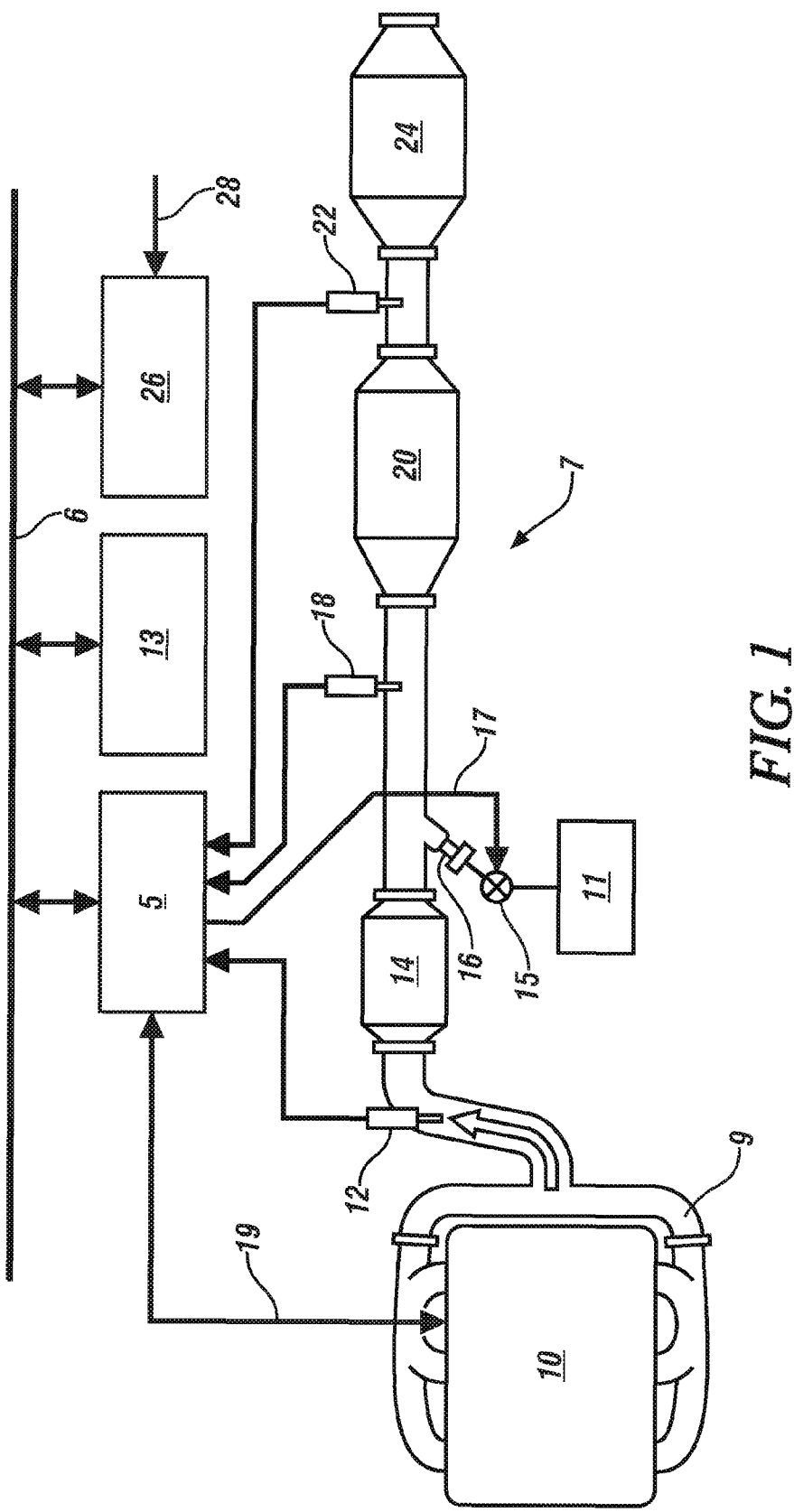
FIG. 1 schematically depicts an exemplary internal combustion engine, an exhaust aftertreatment system, and a control system, in accordance with the present disclosure.

Referring now to the drawings, wherein the showings are for the purpose of illustrating certain exemplary embodiments only, and not for the purpose of limiting the same, FIG. 1 schematically depicts an exemplary internal combustion engine, an exhaust aftertreatment system, and a control system in accordance with an embodiment of the claimed subject matter.

The exemplary engine and control system comprise a conventional four-cycle internal combustion engine 10 and electronic engine control module (ECM) 5. The exemplary engine 10 comprises a known compression-ignition engine having an operating regime that is primarily lean of stoichiometry. Alternatively, the engine 10 may comprise an engine employing any one of a number of engine control strategies that operate lean of stoichiometry, e.g., homogeneous-charge compression-ignition engines, and lean-burn spark-ignition engines.

The engine 10 includes a plurality of reciprocating pistons attached to a crankshaft, which is operably attached to a vehicle driveline (not shown) to deliver tractive torque thereto. Engine 10 generates an exhaust feedstream illustrated by arrow 8, which comprises regulated constituent elements, typically including hydrocarbons (HC), carbon monoxide (CO), nitrides of oxygen (NOx), and particulate matter (PM), among others.

The exhaust aftertreatment system 7 comprises an integrated system acting to convert constituent elements of the exhaust gas feedstream 8 to harmless gases through processes such as oxidation and reduction. An exhaust manifold 9 entrains and directs engine exhaust gases to the exhaust aftertreatment system 7. The exemplary exhaust aftertreatment system 7 includes catalytic reactor devices comprising an oxidation catalyst (DOC) device 14, a selective catalyst reduction (SRC) device 20, and a catalyzed diesel particulate filter (CDPF) device 24. Each of the catalytic reactor devices comprise a known device, which employs known technology having various capabilities for processing the constituent elements of the exhaust feedstream.

The DOC device 14 reduces particulate matter, hydrocarbons, and carbon monoxide in the exhaust feedstream 8 through oxidation. The SCR device 20 reacts with NOx in the exhaust feedstream 8 to reduce the NOx emissions. The CDPF device 24 collects particulate matter from the exhaust feedstream 8 before it is released into the atmosphere. The catalytic devices described with reference to FIG. 1 are preferably connected fluidly in series using known pipes and connectors. The arrangement and utilization of these specific catalytic devices are intended to be illustrative and not restricting to a specific design or layout for the exhaust aftertreatment system 7.

The exhaust aftertreatment system 7 may also include a variety of sensors signally connected to the ECM 5. For purposes of illustration, representative sensors 12, 18, and 22 are respectively shown at locations upstream of the DOC device 14, between the DOC device 14 and the SCR device 20, and between the SCR device 20 and the CDPF device 24. Each of the sensors 12, 18, and 22 may comprise one or more known temperature sensors, exhaust gas mass flow rate sensors, NOx sensors, ammonia ($NH_3$) sensors, air/fuel ratio sensors, oxygen ($O_2$) sensors, and/or any other type of exhaust gas constituent sensors providing EMC 5 with parametric information useful for controlling the exhaust aftertreatment system 7.

Sensors 12, 18, and 22 may also take the form of known virtual sensors comprising algorithms and/or calibration lookup tables resident in ECM 5 that are operative to compute electrical signals correlatable to values of the above described sensed exhaust gas parameters based upon current engine operating conditions.

Exhaust aftertreatment system 7 also includes a dosing system 11 having a refillable storage tank (not shown) containing a dosing agent. Dosing system 11 is fluidly connected to a metering valve 15, which in turn is fluidly connected to a dosing injector 16. Dosing injector 16 is operable to inject dosing agent into exhaust aftertreatment system 7 upstream from SCR device 20. ECM 5 is signally connected to metering valve 15, and provides a dosing rate signal ($NH3_{dose}$) illustrated by arrow 17 for controlling the amount and timing of dosing agent injected into exhaust aftertreatment system 7.

The injected dosing agent is preferably diesel exhaust fluid (DEF), which is aqueous solution of urea mixed with deionized water. In the exhaust feedstream 8, the urea in the DEF decomposes to form ammonia ($NH_3$), which is stored in SCR device 20. Other known dosing agents such as anhydrous or aqueous ammonia could also be used instead of DEF to provide the ammonia for storage in SCR device 20.

As discussed previously, NOx in the exhaust gas feedstream 8 passing through the SCR device 20 is reduced by the stored ammonia ($NH_3$) on its catalyst surface into nitrogen gas ($N_2$), water ($H_2O$), and small amounts of carbon dioxide ($CO_2$), which then exit the SCR device 20.

The SCR device 20 is able to continue such NOx reduction using the stored $NH_3$ when the dosing agent is not being injecting into exhaust aftertreatment system 8. The maximum $NH_3$ storage capacity of the SCR device 20 is inversely related to its operating temperature established by the hot exhaust gas entering the SCR device 20.

As will be recognized by those skilled in the art, exhaust aftertreatment system 7 may also include other dosing systems, such as for injecting hydrocarbon reductant (i.e., HC dosing) that are not pertinent to the claimed subject matter, and accordingly have not been shown as present in FIG. 1.

ECM 5 is preferably a modular component of a vehicle distributed control module architecture having a plurality of control modules adapted to provide coordinated control of various vehicle systems including the vehicle transmission, and other powertrain driveline components. ECM 5 is operable to monitor inputs from sensing devices, synthesize pertinent information, and execute algorithms to control various actuators in order to achieve control targets, including such parameters as fuel economy, emissions, performance, driveability, and protection of hardware.

ECM 5 is shown operably connected to the engine 10 by way of interface 19, and functions to acquire data from sensors, and control a variety of actuators associated with engine 10 that have not been shown in FIG. 1. In operation, ECM 5 receives an engine torque command, and generates a desired torque output, based upon the vehicle operator inputs. Exemplary engine operating parameters that are sensed by ECM 5 using the aforementioned sensors include engine temperature, as indexed by methods such as monitoring engine coolant temperature, oil temperature, or metal temperature; crankshaft rotational speed (RPM) and position; manifold absolute pressure; ambient air flow and temperature; and ambient air pressure; measured and inferred combustion parameters, including air/fuel ratio, location of peak combustion pressure, among others.

As discussed above, ECM 5 is also operably connected to various sensors 12, 18, and 22, along with metering valve 15 for controlling operation of exhaust aftertreatment system 7. In addition to ECM 5, the vehicle distributed control module architecture includes a user interface (UI) 13, which is operably connected to a plurality of other devices (not shown) through which a vehicle operator typically controls or directs operation of the vehicle and powertrain. Exemplary devices through which a vehicle operator provides input to the UI 13 typically include an accelerator pedal, a brake pedal, transmission gear selector, and a vehicle speed cruise control, all of which are well known in the art.

Each of the aforementioned controllers and devices communicate with all other controllers, devices, sensors, and actuators via a high-speed local area network (LAN) bus, depicted generally as item 6. The LAN bus 6 allows for structured communication of control parameters and commands between the various processors, control modules, and devices. The specific communication protocol utilized is application-specific. The LAN bus 6 and appropriate protocols provide for robust messaging and multi-controller interfacing between the aforementioned controllers, and other controllers providing functionality such as antilock brakes, traction control, and vehicle stability.

The ECM 5 is preferably a general purpose digital computer generally comprising a microprocessor or central processing unit, read only memory (ROM), random access memory (RAM), electrically programmable read only memory (EPROM), high speed clock, analog to digital (A/D) and digital to analog (DIA) circuitry, and input/output circuitry and devices (I/O) and appropriate signal conditioning and buffer circuitry. ECM 5 typically has sets of control algorithms, comprising resident program instructions, along with calibrations, and other information stored in ROM. Algorithms are typically executed during preset loop cycles, with each control algorithm executed at least once each loop cycle. Loop cycles are typically executed each 3.125, 6.25, 12.5, 25 and 100 milliseconds during engine operation. Alternatively, control algorithms may be executed only in response to occurrence of predetermined events.

FIG. 1 also illustrates a connectivity device 26 connected to LAN bus 6. Connectivity device 26 represents one or more devices such as a GPS receiver, a Lidar, radar, and/or camera device, a wireless communication device such as for internet, vehicle-to-vehicle and/or vehicle-to-infrastructure communications, and other know devices capable of monitoring connectivity information 28 related to the environment in which the vehicle is operating. Connectivity device 26 is operable to monitor its related connectivity information available outside the vehicle, and transfer data related thereto to ECM 5 via the LAN bus 6. As will be described subsequently, the claimed subject matter utilizes such connectivity information to predict vehicle operating conditions.

Figure 2:
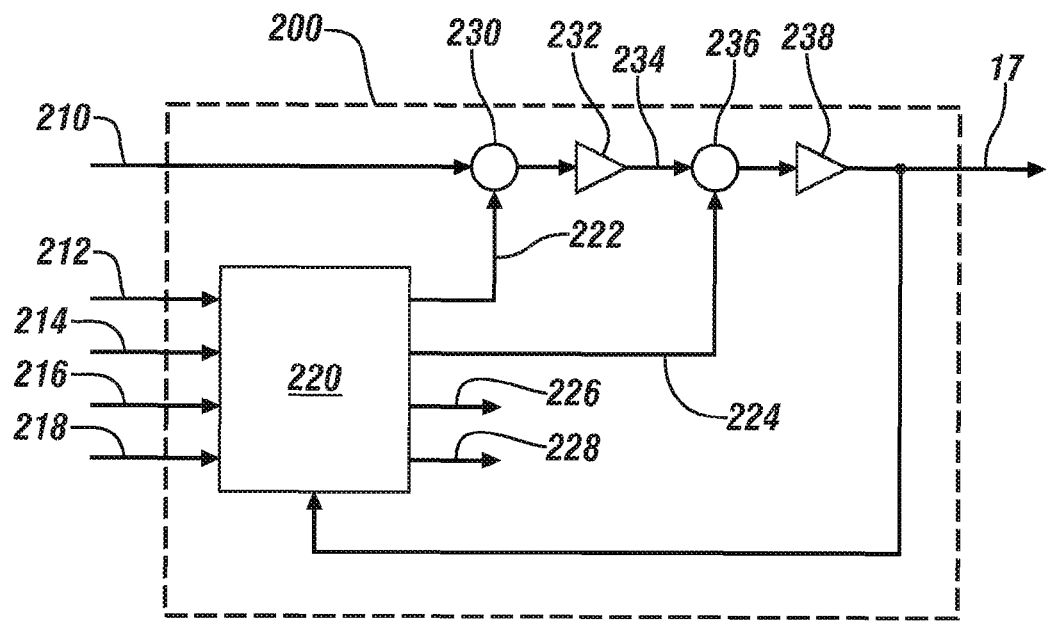
FIG. 2 schematically depicts a functional block diagram for an exemplary SCR ammonia storage control module, in accordance with the present disclosure.

Referring now to FIG. 2, there is shown an exemplary functional block diagram for a SCR ammonia storage control module 200, which preferably resides in ECM 5. The SCR ammonia storage control module 200 operates to output a dosing rate signal $NH3_{dose}$ designated by arrow 17, which is applied to metering valve 15 to determine the amount of dosing agent injected via dosing injector 16 into the exhaust aftertreatment system 7. The SCR ammonia storage control module 200 generates the $NH3_{dose}$ signal 17 based upon control input signals 210, 212, 214, 216 and 218. Control input signal 210 represents an ammonia storage setpoint ($NH3_{step}$) for SCR 20 that defines a desired or target $NH_3$ storage level for SCR 20 that is selected with the expectation of maximizing NOx conversion efficiency, while avoiding $NH_3$ slip. Control input signals 212, 214, 216, and 218 represent parameters characterizing the exhaust gas in exhaust feedstream 8 at the inlet of the SCR device 20. These control input signals 212, 214, 216, and 218 respectively represent the exhaust gas temperature ($T_{inlet}$), the NOx level ($NOx_{inlet}$), the exhaust gas mass flow rate ($\dot{m}_{ex}$), and the exhaust gas oxygen content ($O2_{inlet}$) at the inlet of SCR device 20. All of these control signals 212, 214, 216, and 218 are directed as inputs to a SCR model 220 residing within SCR ammonia storage control module 200. The dosing rate signal $NH3_{dose}$ 17 also acts as a feedback input signal to the SCR model 220.

Based upon the control input signals 212, 214, 216, and 218, and the dosing rate signal 17, SCR model 220 generates SCR model output signals. These SCR model 220 output signals are designated as 222, 224, 226, and 228, and respectively represent SCR model estimates for θ (the amount of $NH_3$ stored in SCR device 20), $NH3_{comp}$ (the $NH_3$ consumption rate in SCR device 20); $NOx_{outlet}$ (the amount of NOx at the outlet of SCR device 20), and $NH3_{outlet}$ (the amount of ammonia slip at the outlet of SCR device 20). The $NOX_{outlet}$ signal 226 and $NH3_{outlet}$ signal 228 are not used directly by the SCR ammonia storage control module 200, but are used in determining optimum ammonia storage setpoints ($NH3_{setp}$) for SCR device 20 in accordance with the claimed subject matter, as will be explained subsequently.

In operation, the SCR ammonia storage control module 200 generates the dosing rate signal ($NH3_{dose}$) 17 by first subtracting the estimated SCR stored $NH_3$ signal 222 (θ) from the input ammonia storage setpoint signal 210 ($NH3_{setp}$) at summing junction 230. The resulting difference signal is then applied to gain block 232 to obtain signal 234 having a value of $K_1*(NH3_{setp}-\theta)$, where $K_1$ represents the multiplicative gain factor of block 232. The resulting signal 234 is then applied to summing junction 236, and added to the SCR $NH_3$ consumption rate signal 224 ($NH3_{comp}$), the output of which is then applied to gain block 238 having a gain factor of $K_2$. The signal output from gain block 238 represents the dosing rate signal 17 ($NH3_{dose}$), which is represented in equation form as follows:

$$NH3_{dose}=K_2*(NH3_{comp}+K_1*(NH3_{setp}-\theta)) \quad [1]$$

The gain factors $K_1$ and $K_2$ are empirically selected to appropriately match the operating characteristics of metering valve 15 and dosing injector 16, and appropriately weighing the $NH_{comp}$ and the difference $(NH3_{setp}-\theta)$ terms for determining $NH3_{dose}$. Those skilled in the art will recognize that the above approach as essentially proportional feedback control, and that other PID (proportional-integral-derivative) control approaches could also be implemented.

For brevity, only the functional characteristics of SCR model 220 have been discussed above, as modeling of SCR devices for control applications is known in the art (see for example, U.S. Patent and Published Application Nos. U.S. Pat. Nos. 7,736,595; 8,096,110; 8,333,062, and 2011/0005209, all of which are assigned to the same assignee as the present application, and are hereby incorporated by reference).

Conventional methods for controlling the $NH_3$ storage in SCR devices rely on actual or virtual sensors to provide real-time values for parameters characterizing the exhaust aftertreatment system 7. One such conventional method determines values for the SCR ammonia storage setpoint ($NH3_{setp}$) from a calibrated two-dimensional lookup table based on sensed real-time values for the exhaust gas temperature ($T_{inlet}$), and the exhaust gas mass flow rate ($\dot{m}_{ex}$) at the inlet of SCR device 20. Such conventional control methods are reactionary as they have to react to changes in the sensed real-time parameters $T_{inlet}$ and $\dot{m}_{ex}$ after the fact, which results in less than optimal control of ammonia storage in SCR device 20.

The claimed subject matter improves on this conventional method of controlling ammonia storage in the SCR device 20 by monitoring vehicle connectivity information, utilizing this connectivity information to predict vehicle operating conditions, and then using the predicted vehicle operating conditions to optimize SCR ammonia storage for improved NOx conversion, and reduced $NH_3$ slip.

Electronic means for tracking vehicle position and coordinating vehicle position with geographic, road, traffic, or other information regarding a vehicle's operating environment are known. Monitoring such data (referred to herein as connectivity information) is conventionally known in the art as utilizing map preview information. Known electronic devices (referred to herein as connectivity devices) that can be used to monitor and acquire such connectivity information include global position system (GPS) receivers in coordination with electronic maps, digital map software using means to track the movement of the vehicle, internet based wireless accessible data processing, vehicle to vehicle communications, vehicle to infrastructure communications, and other vehicle remote sensing systems such as radar, camera, and Lidar devices. Additional connectivity information that also be made available wirelessly include road classification, such as highway, local road, parking lot, gravel road; speed limits for various stretches of road; traffic conditions for various stretches of road, including real-time evaluations of congestion, signals sent from cooperating vehicles experiencing traffic issues, analysis of cellular phone patterns in other cars, predictions based upon likely rush hour traffic or sporting event traffic; road slopes; road curvature; location and status of traffic lights, signals, construction zone markers, speed bumps, or other traffic direction indicators impacting vehicular travel; existence or lack of features likely to impact travel along a certain stretch of road, such as exit ramps or truck weigh stations; and analysis of vehicle or specific operator driving patterns, habits, registered schedules, electronic planner calendars, or other predictive measures. Additionally, likely paths of travel can be estimated based upon operator entered destinations, computerized analysis of driver habits and patterns, or other means known in the art.

By using electronic devices as described above to monitor connectivity information related to the environment surrounding a vehicle, a vehicle's estimated travel path and speed along the estimated travel path can be predicted, and in combination with other factors, for instance road slope, traffic light status, traffic congestion, etc., a prediction can be made regarding the vehicle's engine speed and engine load likely to be demanded or experienced throughout the estimated travel path. The present disclosure makes use of such predicted vehicle engine speed and engine loading along the estimated travel path to optimize SCR ammonia storage setpoint determination.

Figure 3:
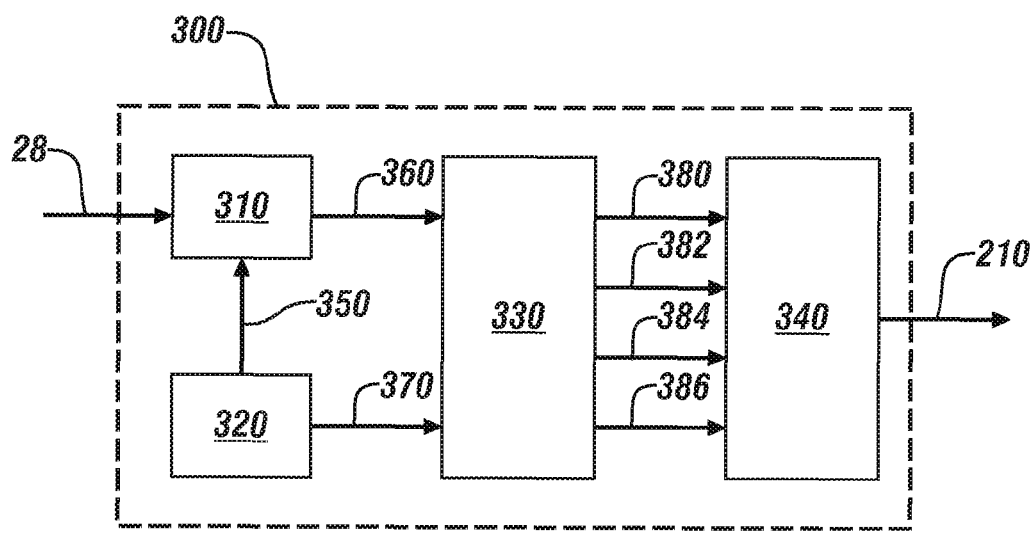
FIG. 3 schematically depicts a functional block diagram for an exemplary predictive SCR ammonia storage setpoint determination module, in accordance with the present disclosure.

Referring now to FIG. 3, there is shown a predictive ammonia storage setpoint determination module 300 for SCR 20, in accordance with the claimed subject matter. This module 300 preferably resides in ECM 5, and comprises a 3D mapping device 310, a vehicle information storage memory 320, a predictive exhaust gas parameter module 330, and a SCR ammonia storage setpoint optimization module 340.

The 3D mapping device 310 processes connectivity information 28 received via the LAN bus 6 as provided by the connectivity device(s) 26, as discussed previously with regard to FIG. 1. The 3D mapping device 310 also receives stored vehicle information 350, which is specific to the particular vehicle being operated, from the vehicle information memory 320. Such vehicle information takes the form of, vehicle weight, transmission shift points, drivetrain gear ratio, and other such vehicle configuration information pertinent to vehicle operation while traversing an estimated travel path. Using this information, 3D mapping device 310 is operable to predict vehicle operating conditions over an estimated path of vehicle travel. Accordingly, 3D mapping device 310 is shown outputting predicted vehicle operating conditions 360. These predicted vehicle operating conditions 360 take the form of predicted time profiles for vehicle speed, engine speed, and engine load for an estimated vehicle travel path.

3D mapping devices such as the above described device 310 are known in the art and have been used in the past to predict vehicle operating condition over estimated paths of travel (see for example, U.S. Patent and Published Application Nos. 8,392,091, 2010/0030437, and 2010/0030447, all of which are assigned to the same assignee as the present application, and are hereby incorporated by reference). As discussed previously, such conventional 3D mapping devices use digital maps for tracking vehicle travel over estimated travel paths via global position systems (GPS), and coordinate vehicle position with other information known in the art as map preview information such as weather, traffic, and road conditions, proximity to other vehicles and infrastructure, and other information know to be pertinent to vehicle travel. By using specific vehicle information in conjunction with connectivity information and mapping technology, 3D mapping device 310 operates to predict the vehicle operating conditions 360 comprising vehicle speed, engine speed and engine load profiles over an estimated path of vehicle travel.

The predictive exhaust gas parameter module 330 receives predicted vehicle operating conditions 360, and stored vehicle engine and exhaust aftertreatment configuration information 370 specific to the particular vehicle traversing the estimated travel path. Such information includes engine calibration tables, engine and exhaust aftertreatment system configurations and specifications, engine volumetric and combustion efficiencies, present fuel mixture, and other information utilized for known engine and exhaust system modeling for the vehicle traversing the estimated travel path.

Using known techniques, the predictive exhaust gas parameter module 360 generates output signals 380, 382, 384, and 386 representing predicted time profiles for exhaust gas parameters over an estimated vehicle travel path in response to the associated predicted vehicle speed, engine speed and engine load profiles (i.e., the predicted vehicle operating conditions 360), and vehicle engine and exhaust aftertreatment configuration information from vehicle information memory 320.

The output signals 380, 382, 384, and 386 generated by the predictive exhaust gas parameter module 360 respectively represent predicted profiles as a function of time for SCR inlet temperature ($T_{inlet}$), SCR inlet NOx levels ($\overline{NOX}_{inlet}$), SCR inlet exhaust gas mass flow rate ($\overline{m}_{ex}$), and SCR inlet oxygen level ($\overline{O2}_{inlet}$) for the expected vehicle travel path. As indicated above, values for these predicted SCR inlet parameters can be computed using known engine and exhaust system modeling techniques given the input predicted time profiles for engine speed and load over the estimated vehicle travel path, and the specific vehicle engine and exhaust aftertreatment configuration information (see for example, issued U.S. Pat. No. 8,855,894, and co-pending U.S. application Ser. No. 14/705,440, all assigned to the same assignee of the present application, and hereby incorporated by reference).

The profiles for the predicted exhaust gas parameter for $T_{inlet}$ 380, $\overline{NOX}_{inlet}$ 382, $\overline{m}_{ex}$ 384, and $\overline{O2}_{inlet}$ 386 for the expected vehicle travel path, which are generated by the predictive exhaust gas parameter module 330 are provided as inputs to the SCR ammonia storage setpoint optimization module 340. As will be described below, SCR ammonia storage setpoint optimization module 340 operates on the input time profiles of the predicted exhaust gas parameters 380, 382, 384 and 386 to determine optimum $NH3_{setp}$ values for the SCR ammonia storage setpoints as a function of time, which are then output as signal 210 acting as input for the SCR ammonia storage controller 200 of FIG. 2.

The operation SCR ammonia storage setpoint optimization module 340 will now be described. For the claimed subject matter, optimum $NH3_{setp}$ values are preferably determined using a receding horizon dynamic programming approach, which is well known in the model predictive control art. This predictive control technique is implemented by determining a set of discrete optimal values for a design variable x, which minimizes an optimization cost function J over a receding horizon time period from t=k to k+n, where J is given by the following relationship:

$$J = \Sigma_{t=k}^{K+n}(NOX_{outlet} + \alpha NH3_{outlet}) \quad [2]$$

where t represents time, n represents the length of a prediction horizon, α represents a weighting factor selected for penalizing the amount of ammonia slip ($NH3_{outlet}$) compared to the amount of NOx ($NOX_{outlet}$) in the exhaust gas at the outlet of SCR device 20. Discrete optimal values of the design variable are given by $x = \{NH3_{setp}(k), NH3_{setp}(k+1), \ldots NH3_{setp}(k+n)\}$. The above minimization of J is subject to the following functional constraints:

$$NH3_{dose} = C(NH3_{setp}, T_{inlet}, NOX_{inlet}, \dot{m}_{ex}, O2_{inlet}), \text{ and} \quad [3]$$

$$\begin{bmatrix} \theta \\ NH3_{comp} \\ NOX_{outlet} \\ NH3_{outlet} \end{bmatrix} = M(NH3_{dose}, T_{inlet}, NOX_{inlet}, \dot{m}_{inlet}, O2_{inlet}), \quad [4]$$

where C is a functional representation of the operation of the SCR ammonia controller 200 on its inputs $NH3_{setp}$ 210, $T_{inlet}$ 212, $NOX_{inlet}$ 214, $\dot{m}_{ex}$ 216, and $O2_{inlet}$ 218 in producing its output $NH3_{dose}$ 17, and M is a functional representation of the operation of SCR model 220 on its inputs $NH3_{dose}$ 17, $T_{inlet}$ 212, $NOX_{inlet}$ 214, $\dot{m}_{ex}$ 216, and $O2_{inlet}$ 218 to produce its outputs θ 222, $NH3_{comp}$ 224, $NOX_{outlet}$ 226, and $NH3_{outlet}$ 228, as illustrated in FIG. 3.

Figure 4:
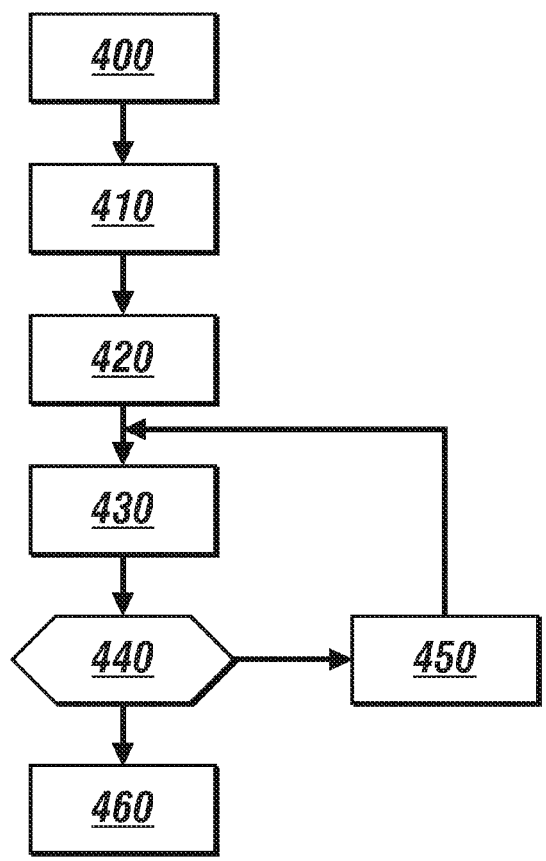
FIG. 4 depicts an exemplary process, for optimizing SCR ammonia storage setpoints, in accordance with the present disclosure.

Referring now to FIG. 4, there is shown an exemplary process carried out in the ammonia setpoint optimization module 340 for determining optimum SCR ammonia storage setpoints in accordance with the above described receding horizon dynamic programming technique based upon the profiles of predicted exhaust gas parameters provided by predictive exhaust gas parameter module 330. Table 1 is provided as a key for the process depicted in FIG. 4, wherein the numerically labeled blocks and the corresponding functions are set forth as follows.

TABLE 1

| BLOCK | BLOCK CONTENTS |
|---|---|
| 400 | Initiate the process for a time t = k |
| 410 | Obtain predicted values for exhaust gas parameters $\overline{T}_{inlet}$ (t), $\overline{NOX}_{inlet}$ (t), $\overline{\dot{m}}_{ex}$ (t), and $\overline{O2}_{inlet}$ (t) at discrete times t = {k, k + 1, ... k + n} |
| 420 | Reset time to t = k + n |
| 430 | Determine an optimal value for the discrete design variable x = $NH3_{setp}$ (t) at time t using the predicted values for exhaust gas parameters $\overline{T}_{inlet}$ (t), $\overline{NOX}_{inlet}$ (t), $\overline{\dot{m}}_{ex}$ (t), and $\overline{O2}_{inlet}$ (t) obtained at step 410 |
| 440 | Determine whether t = k. If t = k, proceed to block 460, and if t ≠ k, then proceed to block 450 |
| 450 | Decrement the current value of time by one (i.e., set t = t − 1), then return to block 430 |
| 460 | Assign the value for x = $NH3_{setp}$ (k) determined at block 430 as the optimal value for the ammonia storage setpoint signal 17 for time t = k |

As will be recognized, the process depicted in FIG. 4 provides an optimal value for the SCR ammonia storage setpoint $NH3_{setp}$ (k) for a selected time of t=k. To determine the next sequential optimum value for the SCR ammonia storage setpoint (i.e., $NH3_{setp}$ (k+1)), the process of FIG. 4 is repeated with time now set at t=k'=k+1 at block 400 (i.e., time is incremented by one to k+1), with all occurrences of k in the process of FIG. 4 being replaced by k'=k+1 such that the cost function J is then minimized over the new receding horizon time period from t=(k+1) to (k+n+1).

As indicated above, the cost function J is preferably minimized using a dynamic programming, a technique well known in the control art. It will be recognized that other optimization techniques could also be used as the claimed subject matter is not limited to the dynamic programming approach with regard to the optimization. The particular application of dynamic programming for determining optimal values for $NH3_{setp}$ (t) will now be described as it applies to block 430 of the process depicted in FIG. 4.

Using the predicted values for the exhaust gas parameters obtain at block 410, an optimal value for $NH3_{setp}$ (k+n) is determined for t=k+n on the first pass through block 430. This optimal value is determined by selecting a value for $NH3_{setp}$ (k n) from a discrete set of values given by $\{(MAXNH3_{storage})/n, 2*(MAXNH3_{storage})/n, \ldots, \text{ and } n*(MAXNH3_{storage})/n\}$ that minimizes the cost function J, where $MAXNH3_{storage}$ represents the maximum amount of ammonia that can be stored in SCR 20 without the occurrence of ammonia slip at the predicted exhaust gas temperature $T_{inlet}$ at time t=k+n, and is determined empirically for a particular SCR device 20 for different values of inlet exhaust gas temperatures $T_{inlet}$, and is typically stored as a lookup table in ECM 20. In determining the optimal value for $NH3_{setp}$ (k+n), the predicted values for the exhaust gas parameters $\overline{T}_{inlet}$, $\overline{NOX}_{inlet}$, $\overline{\dot{m}}_{ex}$, and $\overline{O2}_{inlet}$ at time t=k+n are used as inputs for Eq. (3) and Eq. (4) representing SCR ammonia control module 200 and SCR model 220, in order to determine which value from the above described set of discrete values involving $MAXNH3_{storage}$ will result in outputs values for $NOX_{outlet}$ and $NH3_{outlet}$ that will minimize the cost function J of Eq. (2).

From the above it will be recognized that the optimization performed by the dynamic programming technique is backward calculating, starting at a time t=k+n, and decrementing time by 1 for each pass through block 430 until the final calculation for t=k. Additionally, amount of ammonia stored in SCR device 20 computed as θ by Eq. (4) at t=k+n is then assigned as the value for $NH3_{setp}$ (k+n−1) for the next pass through block 430 in performing the calculations for t=k+n−1. Likewise, the value for θ computed at each pass through block 430 is then assigned as the value for $NH3_{setp}$ for computations performed in the next pass through block 430 (where time is decremented by 1), until the final computations are performed for t=k.

Figure 5:
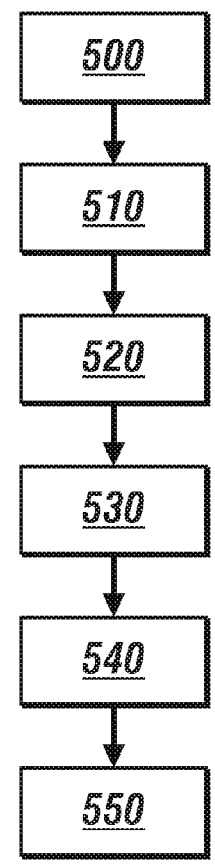
FIG. 5 depicts an exemplary process for controlling ammonia storage in an SCR device based upon monitored vehicle connectivity information, in accordance with the present disclosure.

In summary, FIG. 5 illustrates an exemplary process reiterating the ammonia storage control method of the claimed subject matter with regard to the embodiment disclosed in FIGS. 1-3. Table 2 below is provided as a key explaining the overall control process depicted in FIG. 5, wherein the numerically labeled blocks and the corresponding functions are set forth as follows.

TABLE 2

| BLOCK | BLOCK CONTENTS |
|---|---|
| 500 | Monitor vehicle connectivity information |
| 510 | Predict vehicle operating conditions along an estimated vehicle travel path based on the monitored vehicle connectivity information and stored vehicle configuration information |
| 520 | Predict profiles for vehicle exhaust parameters based on the predicted vehicle operating conditions and stored vehicle engine and exhaust aftertreatment configuration information |
| 530 | Determine SCR ammonia storage setpoints based on the predicted profiles for the exhaust gas parameters |
| 540 | Determine a dosing rate for a dosing agent injected into exhaust gas entering the SCR device based on the determined ammonia storage setpoints, where the dosing agent provides ammonia for storage in the SCR device |
| 550 | regulate the amount of ammonia producing dosing agent injected into exhaust gas based upon the determined dosing rate |

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling ammonia storage in a selective catalytic reduction (SCR) device in an engine exhaust aftertreatment system of a vehicle, the method comprising:
monitoring vehicle connectivity information;
predicting vehicle operating conditions comprising estimating a vehicle travel path based on the monitored vehicle connectivity information, the predicted vehicle operating conditions further comprising a predicted engine speed and a predicted load along the estimated vehicle travel path;
predicting profiles for exhaust gas parameters based on the predicted vehicle operating conditions, the predicted profiles for the exhaust gas parameters comprising SCR inlet temperature ($\overline{T}_{inlet}$), SCR inlet NOx levels ($\overline{NOX}_{inlet}$), SCR inlet exhaust gas mass flow rate ($\overline{\dot{m}}_{ex}$), and SCR inlet oxygen level ($\overline{O2}_{inlet}$) as a function of time for the estimated vehicle travel path; and
regulating an amount of ammonia producing dosing agent injected into the exhaust gas aftertreatment system based on the predicted profiles for the exhaust gas parameters.

2. The method of claim 1, wherein vehicle configuration information is utilized in determining the estimated vehicle travel path and determining the predicted engine speed and the predicted load along the estimated vehicle travel path.

3. The method of claim 1, wherein engine configuration information and exhaust aftertreatment system configuration information are utilized in determining the predicted profiles for the exhaust gas parameters.

4. The method of claim 1, wherein the predicted profiles for exhaust gas parameters are used for determining ammonia storage setpoints for the SCR device, and the regulating the amount of ammonia producing dosing agent injected into the exhaust aftertreatment system is based on the determined ammonia storage setpoints, further wherein the ammonia storage setpoints are determined using receding horizon dynamic programming optimization.

5. A method for operating a selective catalytic reduction (SCR) device configured in an engine exhaust aftertreatment system of a vehicle, the method comprising:
monitoring vehicle connectivity information;
predicting vehicle operating conditions comprising estimating a vehicle travel path based on the monitored vehicle connectivity information, the predicted vehicle operating conditions further comprising a predicted engine speed and a predicted load along the estimated vehicle travel path;
predicting profiles for exhaust gas parameters based on the predicted vehicle operating conditions, the predicted profiles for the exhaust gas parameters comprising SCR inlet temperature ($\overline{T}_{inlet}$), SCR inlet NOx levels ($\overline{NOX}_{inlet}$), SCR inlet exhaust gas mass flow rate ($\overline{\dot{m}}_{ex}$), and SCR inlet oxygen level ($\overline{O2}_{inlet}$) for the estimated vehicle travel path;
determining ammonia storage setpoints based on the predicted profiles for the vehicle exhaust gas parameters; and
controlling storage of ammonia in the SCR device based on the determined ammonia storage setpoints.

6. The method of claim 5, wherein the storage of ammonia in the SCR device is controlled by regulating an amount of ammonia producing dosing agent injected into the exhaust aftertreatment system based on the determined ammonia storage setpoints.

7. The method of claim 5, wherein the ammonia storage setpoints are determined by minimizing a cost function related to amounts of NOx and ammonia in an exhaust gas flowing out of the SCR device.

8. The method of claim 7, wherein the cost function is minimized using receding horizon dynamic programming optimization.

9. The method of claim 7, wherein values for the cost function related to the amounts of NOx and ammonia in the exhaust gas flowing out of the SCR device are estimated by an SCR model based on the predicted profiles for the exhaust gas parameters.

10. The method of claim 6, wherein the regulating the amount of ammonia producing dosing agent injected into the exhaust aftertreatment system is based on a difference between a target amount for ammonia storage in the SCR established by the ammonia storage setpoints and an estimated amount of ammonia storage in the SCR provided by an SCR model.

11. A method for controlling operation of a selective catalytic reduction (SCR) device in an engine exhaust aftertreatment system of a vehicle, the method comprising:
monitoring vehicle connectivity information;
predicting vehicle operating conditions comprising estimating a vehicle travel path based on the monitored vehicle connectivity information, said predicted vehicle operating conditions comprising a predicted engine speed and a predicted load along the estimated vehicle travel path;
predicting profiles for exhaust gas parameters based on the predicted vehicle operating conditions, the predicted profiles for the exhaust gas parameters comprising SCR inlet temperature ($T_{inlet}$), SCR inlet NOx levels ($\overline{NOX}_{inlet}$), SCR inlet exhaust gas mass flow rate ($\overline{\dot{m}}_{ex}$), and SCR inlet oxygen level ($\overline{O2}_{inlet}$) as a function of time for the estimated vehicle travel path; and controlling storage of ammonia in the SCR device based on the predicted profiles for the exhaust gas parameters.

\* \* \* \* \*